May 26, 1953  H. R. BILLETER  2,639,927
CABLE CONNECTOR
Filed Aug. 23, 1949
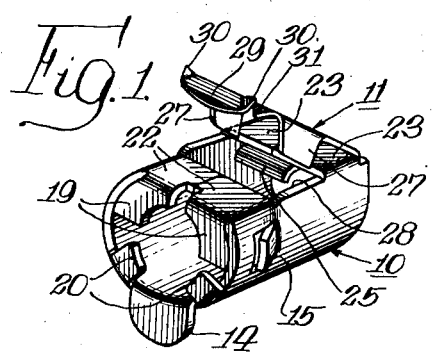
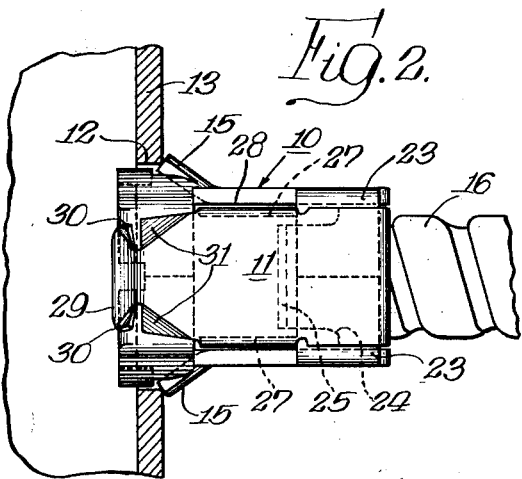
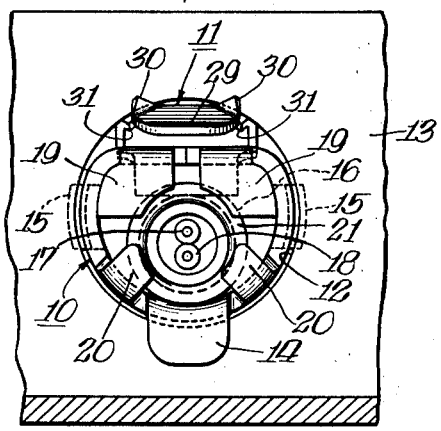
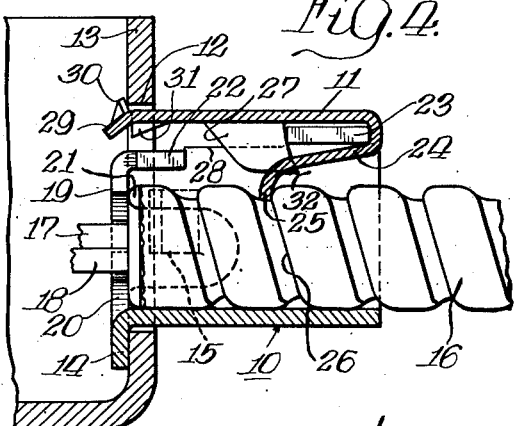
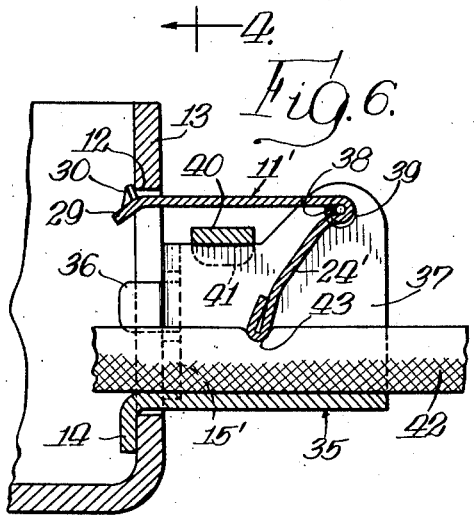
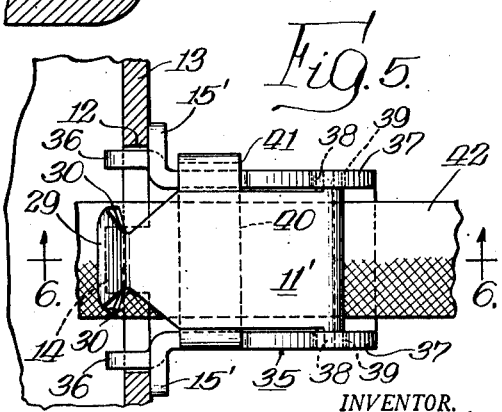
INVENTOR.
Henry Robert Billeter,
BY
Fidler, Crouse & Beardsley
Attys.

Patented May 26, 1953

2,639,927

UNITED STATES PATENT OFFICE 2,639,927

CABLE CONNECTOR

Henry Robert Billeter, Highland Park, Ill.

Application August 23, 1949, Serial No. 111,872

6 Claims. (Cl. 285—6.5)

This invention relates to cable connecters for use in joining non-metallic sheathed cables and armored cables to electric box fixtures, such as outlet boxes, cable boxes, junction boxes, switch boxes and the like.

An object of my invention is to provide an improved cable connecter having a novel means to securely clamp a cable therein and for quickly and easily installing and anchoring the cable connecter without the use of tools in an outlet box or other electrical fixture from the outside of the box.

Another object of the invention is to provide an improved cable connecter which holds the conduit tightly and will not loosen under vibration and wherein the tight grip of the connecter assures a good ground connection.

A further object of the invention is to provide an improved cable connecter which is simple and inexpensive to manufacture, which comprises only two parts, both of which are simple stampings.

Another object of the invention is to provide an improved cable connecter which requires no machine operations such as drilling, tapping or external threading.

Another object of the invention is to provide a cable connecter which is neat and compact in appearance without projecting ears or screws.

Another object of the invention is to provide an improved cable connecter adapted to accommodate a number of conduit sizes.

A further object of the invention is to provide an improved cable connecter which may be easily removed for re-use for any other connection or for any other reason during installation.

In carrying out my invention, I preferably utilize in the preferred embodiment two elements, namely, a rigid connecter body element and a hinged spring element adapted to engage the conduit and the box. The hinged gripping element is arranged so that the pressure against the conduit is opposed by the pressure against the box.

In the preferred form of my invention, the connecter body is provided with a projection at its lower end to engage the interior of the outlet box adjacent the knock-out opening in which the connecter is inserted and with laterally extending lugs to engage the outer surface of the outlet box contiguous to the knock-out opening.

The hinged gripping element is mounted upon the rigid body element and so formed as to engage the interior of the outlet box adjacent the knock-out opening when it is pressed downwardly and inserted through the knock-out opening for mounting the cable connecter. The opposite end of the hinged gripping element is adapted to engage the non-metallic sheathed cable or armored cable so that pressure against the conduit is opposed by pressure against the box. The arrangement of the body element and the hinged gripping element is such that increased pull on the conduit increases the gripping pressure against the conduit or cable.

In another modification of my invention, the rigid body element is similarly formed as in the preferred embodiment but the gripping element is pivotally mounted upon the body element and is resiliently formed to engage the outlet box and the cable so that increased pull on the conduit increases the pressure of the gripping member against the outlet box.

In assembling the cable connecter and cable mounted therein to an outlet box, the cable connecter is inserted at an angle to permit entrance of the lug on the cable connecter to engage the interior of the outlet box whereupon the cable connecter is tilted upwardly; and, at the same time, the hinged spring element is pressed downwardly to permit insertion of the hinged spring element within the knock-out hole, whereupon the hinged spring element is released and the cable connecter is latched in place within the knock-out hole of the outlet box securing the cable and cable connecter. Removal may only be had by releasing the hinged spring element by pressing downwardly thereon, whereupon the cable connecter may be removed by an opposite motion to that for the mounting of the cable connecter.

This and other advantageous objects which will later appear are accomplished by the simple and practical construction and arrangement of parts hereinafter described and illustrated in the accompanying drawing forming a part hereof, and in which:

Figure 1 represents a perspective view of the preferred form of the cable connecter of my invention;

Fig. 2 illustrates a top plan view, partly in section, of the cable connecter in an outlet box and supporting an armored cable;

Fig. 3 is a front elevation of the cable connecter as shown in Fig. 2;

Fig. 4 is a vertical sectional view, partly in section, taken along line 4—4, looking in the direction of the arrows, illustrating the rigid body element and the hinged spring element connecting the cable to the outlet box;

Fig. 5 illustrates another embodiment of my invention for mounting a non-metallic sheathed cable to an outlet box; and Fig. 6 is a vertical sectional view of the modified cable connecter of my invention taken along line 6—6 of Fig. 5, looking in the direction of the arrows.

The preferred form of my invention, illustrated in Figs. 1 to 4 inclusive, comprises two members, namely, the connecter body 10 and a hinged spring element 11. It is preferred to form the members 10 and 11 from metal stampings suitably treated to prevent rusting.

The rigid body element 10 is substantially cylindrical in shape to receive a conventional armored cable, although the spring construction of the hinged spring element 11 permits the accommodation of a number of cable or conduit sizes. The rigid body element is formed to be readily inserted within a conventional knock-out hole 12 of an outlet box 13 and the body element is formed with a downwardly extending lug 14 adapted to engage the inner wall face of the outlet box 13, as illustrated in Figs. 3 and 4. Outwardly struck lugs 15, Figs. 1 and 2, are adapted to engage the peripheral edge of the knock-out hole, as illustrated in Fig. 2, so that with the lug 14, the wall of the conduit box is adapted to be positioned therebetween to prohibit movement of the cable connecter when it is affixed to the outlet box.

Referring to Figs. 2 to 4, a conventional armored cable 16, commonly called in the trade "BX" cable, is illustrated as mounted within the body 10 of the cable connecter and the insulated conductors 17 and 18 extend through an opening provided by the symmetrically positioned and formed lugs 19 and 20, as illustrated in Fig. 1, formed from the peripheral surface of the cable connecter body 10. The lugs 19 and 20 not only provide an opening for the conductors but also provide a bottom wall surface for supporting a conventional, fiber insulating bushing or washer 21, Fig. 4. The stops provided by the lugs 19 and 20 locate the inner end of the armored cable and the insulating bushing within the cable connecter and they likewise provide peep holes allowing inspection.

Symmetrically formed chord-shaped members 22 complete the inner end of the connecter body 10 forming a front cross-bar and spaced therefrom and elevated thereabove are additional chord-shaped members 23 which provide a rear cross-bar or a support for the hinged spring element 11.

From the above description of the rigid body element 10 of the cable connecter, it is evident that the body element may be simply formed from a metal stamping by first forming the various lugs as described and then punching from a continuous strip of metal as is well understood in the art, after which the stamping may be shaped as illustrated in Fig. 1 to form the rigid body element. Furthermore, it is evident that no additional machine operations, such as drilling, tapping or external threading, are necessary to be performed on the connecter body for assembling the cable thereto or assembling the connecter body to the outlet box.

The hinged spring element 11 is suitably formed from a metal stamping and the metal from which the hinged spring element is formed is preferably of carbon steel or other suitable material with enough spring that it may be removably snapped over a portion of the body member, for example as illustrated in Fig. 4.

The hinged gripping element 11 is preferably substantially J-shaped, as illustrated in Fig. 4, with a downwardly extending portion 24 having a curved end 25 adapted to engage the helical groove 26 of the cable 16. Downwardly extending wings 27 are formed on the hinged spring element, shaped as illustrated in Figs. 1, 2 and 3, and are adapted to extend downwardly through opening 28 provided between the chord-shaped members 22 and 23.

The end of the hinged spring element 11, which is adapted to be inserted through the knock-out opening 12 of the outlet box, is preferably shaped as illustrated in Figs. 1 to 4, having a downturned end 29 from which are struck symmetrically formed upturned latching lugs 30. Portions 31 are struck downwardly to permit the latching lugs 30 to at all times engage the inner peripheral edge of the knock-out hole 12 when the cable connecter is assembled.

It is evident that the hinged spring element 11 may be simply formed by a simple blanking operation after which it may be formed into the J-shaped section, as illustrated in Fig. 4. If necessary, the spring element 11 may be suitably heat treated to retain its resiliency in order that the cable connecter may be easily removed for re-use or for any other reason during installation without losing its shape, so as to provide at all times an effective latching means for the cable connecter. The latching means or hinged spring element 11 for the cable connecter is assembled to the connecting body 10 of the cable connecter by inserting the chord shaped member 23 of the cable connecter in a passageway 32 provided between the curved end portion 25 of the hinged spring element and the downturned wings 27 thereof. The spring gripping member 11 is provided with enough spring so that the wings 27 may be snapped over the edge of the members 23 to assemble the spring gripping member 11 upon the connecter body as shown in Fig. 1.

It is thus evident that a simple cable connecter is provided wherein the connecter bodies may be separately packaged, as well as the hinged spring element, for ease in shipment, after which the completed cable connecters may be assembled where they are being used or it is also within the scope of the invention that the completed cable connecter may be assembled as a complete unit, as illustrated in Fig. 1 and as described above.

Although, in the preferred embodiment, the cable connecter has been described for use particularly with the conventional armored cable, it is to be understood that it is within the scope of the invention that this form of cable connecter is suitably adapted for use with a non-metallic sheathed cable.

Referring to Figs. 1 to 4, the improved cable connecter of my invention is quickly and easily installed without the use of tools from the outside of the outlet box. In using my invention, a knock-out of the outlet box 13 is removed, leaving the knock-out hole 12. The cable 16 is prepared in a conventional manner to provide the conductors 17 and 18. A conventional fiber bushing 21 is mounted on the cable and the cable is inserted within the cable connecter 10, as illustrated in Fig. 4.

The hinged spring element 11 may then be assembled on the connecter body 10 as described, preferably with the curved end 25 engaging the helical groove 26 of the cable, as illustrated, while latching the cable in its assembled position with the connecter body. The operator then inserts the assembled cable and connecter body so that the lug 14 is positioned within the outlet box through the knock-out hole 12. In this position, the cable connecter is at an acute angle with respect to the outlet box. The operator then presses down on the front end of the hinged spring element 11 a sufficient amount to permit the latching lugs 30 to be inserted within the knock-out hole 12 as the connecter body is raised upwardly to the position shown in Fig. 4. The hinged spring element is then released and the latching lugs 30 engage the inner peripheral edge of the knock-out hole 12 as shown in Figs. 3 and 4. The lug 14 and the latching lugs 30 prevent outward movement of the cable connecter and inward movement of the cable connecter is prevented by the lugs 15, Fig. 2.

From this construction, it is evident that the cable connecter is rigidly latched in position on the outlet box and at the same time the cable is held tightly and will not loosen under vibration. At the same time, it assures a good ground connection between the conduit box and the cable. It is also obvious that the resilient construction of the downwardly extending end 24 of the hinged spring element 11 yields enough to accommodate a number of cable or conduit sizes. Any outward pull upon the cable will not loosen the cable, and it also tends to prevent the unlatching of the latch members 30. The wings 27 and the construction of the downwardly extending end 24 of the hinged spring element also effectively latch the hinged spring element to the rear cross-bar formed by the members 23 of the cable connecter body.

To remove the cable connecter for assembly or re-use of the cable connecter, it is simply necessary to press downwardly on the hinged spring element 11 to release the latching lugs 30, whereupon the cable connecter is moved downwardly from the position shown in Fig. 4 to a position so that the lug 14 may be withdrawn through the knock-out hole. The cable may be withdrawn readily by removing the connecter from the box with an action the reverse of that in which it was inserted in the box. Thusly, the cable connecter may be re-used many times.

In the second embodiment of my invention illustrated in Figs. 5 and 6, I have shown a cable connecter used with a non-metallic sheathed cable. It is to be understood, however, that this form is equally well adapted for use with armored cable, as described above with reference to the preferred embodiment of my invention.

Specifically, this embodiment comprises a U-shaped cable connecter body 35 provided with a downturned lug 14 and laterally extended lugs 15' for engaging the inner and outer surfaces of the outlet box 13. Forwardly extending lugs 36 symmetrically formed in position are formed on the legs 37 of the U-shaped cable connecter. A hinged spring element 11' is formed with laterally extending pintles 38 and they are adapted to be inserted within holes 39 of the legs 37 as illustrated in Figs. 5 and 6 for hingedly mounting the hinged spring element 11'.

In assembling the hinged spring element, it is preferred to have the U-shaped legs 37 first formed spread apart from the position shown in Fig. 5 in order that the pintles 38 may be assembled in the holes 39 after which the legs are crimped together, fixing the hinged spring element in position. A front cross-bar 40 is formed from one of the legs 37 and formed to the shape illustrated for the downturned end 41 to engage the opposite leg as illustrated. The forward end of the hinged spring element 11' is similarly formed as the preferred embodiment, being provided with a downturned end 29 and symmetrically formed upturned latching lugs 30 and portions 31. The downturned end 24' is formed as illustrated in Fig. 6 with the end thereof returned upon itself as shown to prevent cutting of the non-metallic sheathed cable.

As described above with reference to the preferred embodiment of my invention, the connecter body and the hinged spring element may be separately formed and packaged to be assembled upon the job and when so formed, the legs 37 are spread apart sufficiently to permit assembly of the pintles 38 of the hinged spring element and the front cross-bar 40 is unlatched from the leg 37 so that the hinged spring element may be assembled, after which the front cross-bar 40 is latched in its assembled position as shown.

In assembling a non-metallic sheathed cable 42, the correct length of cable is inserted in the U-shaped body of the cable connecter as shown in Figs. 5 and 6. The cable is latched in place by the downturned end 24' of the hinged spring element as shown in Fig. 6, crushing the cable as at 43 securely latching the cable in position. The cable connecter and assembled cable is then inserted through the knock-out opening 12 as described above with reference to the preferred form of cable connecter by first inserting the lug 14 within the outlet box, tilting the cable connecter at an angle and pressing down on the latch 11' permitting the lugs 30 to enter the opening 12 whereupon, in the position as shown in Fig. 6, the latch is then released locking the cable connecter in position as shown in Figs. 5 and 6 and effectively latching the cable in position.

Movement of the cable connecter inwardly or outwardly is prevented by the lugs 14 and 15' and the latching lugs 30. The cable connecter may also be removed for re-use or for any other reason during installation by pressing down on the hinged spring element unlatching the lugs 30 of cable connecter from the knock-out hole 12, whereupon it may be removed by tilting downwardly to a position so that the lug 14 may be removed from the knock-out hole. The cable 42 may be then unlatched by pivoting the hinged spring element 11' in a clockwise direction to then release the member 24' from the cable.

As described with reference to the embodiment of Figs. 1 to 4, the hinged spring element of Figs. 5 and 6 is preferably formed of a suitable material such as carbon steel which is inherently resilient or may be rendered resilient by suitable heat treatment if necessary. This modified cable connecter is readily adaptable as the preferred embodiment for re-use and likewise for the mounting of armored cable to an outlet box. The inherent resiliency of the member 24' also permits accommodation of a number of non-metallic sheathed cable sizes as well as armored cable sizes.

It is thus evident that there has been disclosed in the preferred embodiments of my invention a cable connecter construction which may quickly and easily be installed from the outside of the box without the use of tools or which may easily be removed for re-use or for any other reason. In addition, the cable connecter of this invention holds the conduit or cable tightly and will not loosen under vibration and the hinged gripping element thereof is arranged so that an increased pull on the conduit or cable increases the pressure of the gripping member against the outlet box. Furthermore, the cable connecter of this invention has a compact appearance without projecting ears or screws.

Also, with the improved construction of the cable connecter of my invention, the construction is such that there is no danger of injury to the cable and the cable may be readily inserted in and removed from the connecter body as described with reference to the assembly and disassembly of the cable and connecter to the outlet box on which it is mounted.

The foregoing disclosure is to be regarded as descriptive and illustrative only, and not as restrictive or limitative of the invention, of which obviously an embodiment may be constructed including many modifications without departing from the general scope of the invention as herein indicated and denoted in the appended claims.

It is to be understood that the protection herein applied for is not confined to the particular combination of features or elements set out in the following claims. Protection is herein applied for any one or more of the features or elements referred to in the following claims, or described in the foregoing specification, or shown in the accompanying drawing, either independently or in combination.

I claim:

1. The combination with an outlet box having a knock-out opening, and a cable adapted to be connected thereto, of a cable connecter comprising a connecter body adapted for insertion in the knock-out opening and to receive the cable, said connecter body having a holding lug adjacent an inner end engageable with the inside face of the outlet box wall with its outer end extended outwardly from the outlet box, and single latching means for detachably affixing the connecter body to the outlet box and the cable to the connecter body, comprising a generally U-shaped resilient spring member mounted on the connecter body adjacent the outer end of the latter and having a first and a second leg resiliently movable toward each other, the first leg extending into the connecter body and engageable with the cable disposed therein and the second leg extending longitudinally of the connecter body, generally exteriorly thereof, and having a lug engageable with the inside face of the marginal edge of the opening, said second leg having a substantial length longitudinally of the body for enabling engagement therewith by a thumb or finger, said second leg, when the cable is in the body, being normally spaced from the other parts of the connecter that are located inwardly thereof, in a direction transversely of the connecter, and from the cable, a distance at least as great as the length of the lug on the leg whereby the leg can be moved toward the first leg a distance sufficient for insertion of the connecter in the opening and removing it therefrom.

2. The combination with an outlet box having a knock-out opening, and a cable adapted to be connected thereto, of a cable connecter comprising a connecter body adapted for insertion in the knock-out opening and to receive the cable, said connecter body having a holding lug adjacent an inner end engageable with the inside face of the outlet box wall with its outer end extended outwardly from the outlet box, and single latching means for detachably affixing the connecter body to the outlet box and the cable to the connecter body, comprising a generally U-shaped resilient spring member hingedly mounted on the connecter body adjacent the outer end of the latter and having a first and a second leg resiliently movable toward each other, the first leg extending into the connecter body and engageable with the cable disposed therein and the second leg extending longitudinally of the connecter body, generally exteriorly thereof, and having a lug engageable with the inside face of the marginal edge of the opening, said second leg having a substantial length longitudinally of the body for enabling engagement therewith by a thumb or finger, stop means on the body for limiting movement of the second leg toward the first leg, the second leg, when the cable is in the body, being spaced from said stop means a distance at least as great as the length of the lug on the leg whereby the leg can be moved toward the first leg a distance sufficient for insertion of the connecter in the opening and removing it therefrom.

3. The combination with an outlet box having a knock-out opening and a cable adapted to be connected thereto, of a cable connecter comprising a connecter body adapted for insertion of an inner end in the knock-out opening and to receive the cable, said connecter body having a cross-bar positioned adjacent the opposite end and extending transverse to the longitudinal axis of the connecter body, a generally U-shaped spring gripping member for detachably affixing the connecter body and cable to the outlet box, and said spring gripping member comprising a first, inwardly extending member adapted to engage the cable, a second member springable toward and from the first member, and extending longitudinally of the connecter body, and abutment elements on one of the members adapted to engage the cross-bar, whereby the gripping member is assembled to the connecter body by being snapped over the transverse cross-bar with the cross-bar positioned between said members and abutment elements, said second member having a lug engageable with the inside face of the outlet box wall.

4. As an article of manufacture, a cable connecter adapted for connecting a cable to an outlet box, said cable connecter comprising a U-shaped body element adapted to receive the cable and to be inserted in a knock-out opening in the outlet box, spaced locating means formed on the U-shaped body member adjacent one end thereof for engaging respectively the inside and outside faces of the box wall and thereby positioning the body member in the opening, a generally U-shaped gripping element having a first and a second leg resiliently movable toward each other pivoted in the side portions of the body member adjacent the end opposite said one end, said first leg extending into the body member and said second leg extending a substantial distance longitudinally of the body member, generally exteriorly thereof, and having a lug on its extended end for engaging the inside face of the marginal edge of the opening, said second leg, when the cable is in the body member, being normally spaced from the remaining parts of the body member that are located inwardly thereof, in a direction transversely of the connecter, and from the cable, a distance at least as great as the length of the lug on the leg.

5. A cable connector for use with a cable and an outlet box having a knock-out opening, comprising a hollow body member having a portion of cylindrical contour and a portion forming a chord, and having lugs at one end engageable respectively with the inside and outside faces of the marginal edge of the knock-out opening for retaining the connector therein, said body member having a transverse member at its opposite end parallel with said chord portion, and a spring latching member removably mounted on said transverse member and having legs straddling the transverse member with a first leg extending into the body member and a second leg overlying said chord portion, said second leg having a lug at its extended end engageable with the inside face of the marginal edge of the opening in response to the cable being positioned in the body member and engaging said first leg, said first leg being operative for retaining the cable in the connector, said second leg, when the cable is in the connecter, being normally spaced from said chord portion a distance at least as great as the length of the lug on the leg.

6. As an article of manufacture, a cable connecter adapted for connecting a cable to an outlet box, said cable connecter comprising a U-shaped body element adapted to receive the cable and to be inserted in a knock-out opening in the outlet box, spaced locating means formed on the U-shaped body member adjacent one end thereof for engaging respectively the inside and outside faces of the box wall and thereby positioning the body member in the opening, a cross bar across its open side adjacent said one end, a generally U-shaped gripping element having a first and a second leg resiliently movable toward each other pivoted in the side portions of the body member adjacent the end opposite said one end, said first leg extending into the body member and said second leg extending a substantial distance longitudinally of the body member, generally exteriorly thereof, and having a lug on its extended end for engaging the inside face of the marginal edge of the opening, said second leg overlying said cross bar and being normally spaced therefrom, when the cable is in the body member, a distance at least as great as the length of the lug on the leg, said cross bar constituting stop means for limiting movement of the second leg toward the first leg.

HENRY ROBERT BILLETER.

References Cited in the file of this patent

UNITED STATES PATENTS

| Number | Name | Date |
|---|---|---|
| 2,130,536 | Chaffee | Sept. 20, 1938 |
| 2,430,809 | Flora | Nov. 11, 1947 |
| 2,457,235 | Hoehn | Dec. 28, 1948 |
| 2,458,409 | Paige | Jan. 4, 1949 |
| 2,466,504 | Stoyer | Apr. 5, 1949 |